Dec. 13, 1966 ATSUMI NISHIMURA 3,291,170
AUTOMATIC FEED DEVICE FOR HAND FED PLANING MACHINE
Filed May 20, 1964 4 Sheets-Sheet 2

Dec. 13, 1966 ATSUMI NISHIMURA 3,291,170
AUTOMATIC FEED DEVICE FOR HAND FED PLANING MACHINE
Filed May 20, 1964 4 Sheets-Sheet 3

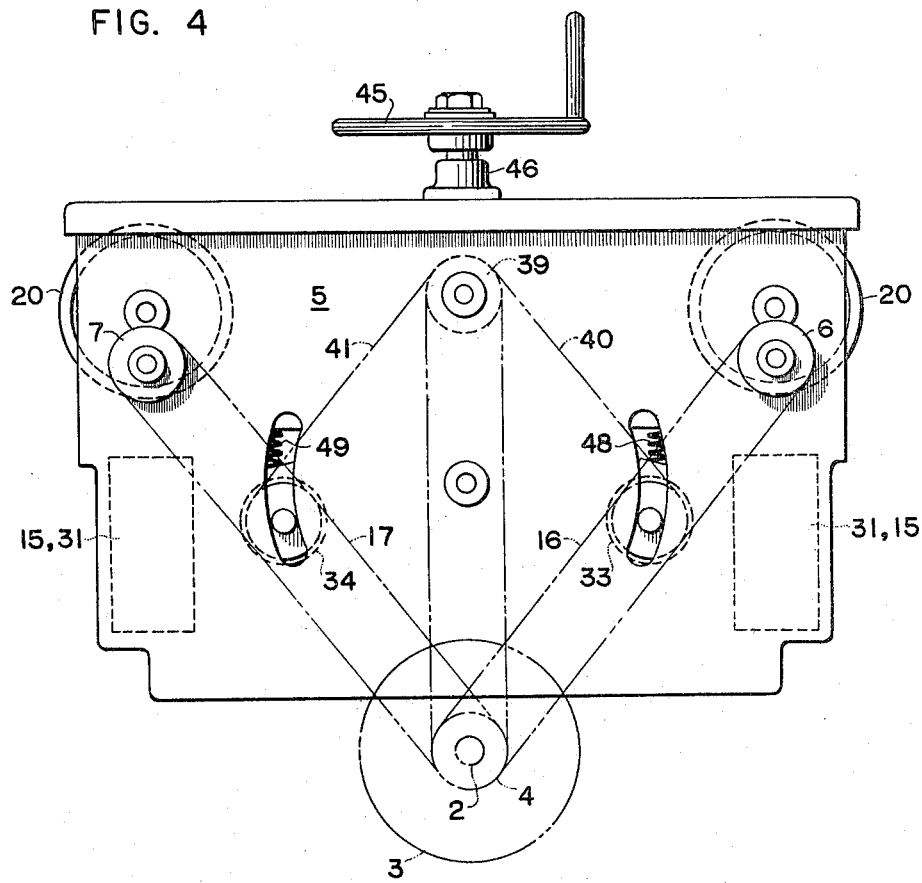

United States Patent Office 3,291,170
Patented Dec. 13, 1966

3,291,170
AUTOMATIC FEED DEVICE FOR HAND FED
PLANING MACHINE
Atsumi Nishimura, 2074–1 Mukojima, Okawa,
Fukuoka, Japan
Filed May 20, 1964, Ser. No. 368,826
Claims priority, application Japan, May 23, 1963,
38/27,054
2 Claims. (Cl. 144—117)

This invention relates in general to a hand fed wood planing machine and more particularly to a feed device for such a machine for automatically feeding a piece of wood thereto for the purpose of planing one surface thereof which is to be planed accurately so that the said surface being planed is perpendicular to the adjacent surface thereof.

In the conventional type of feed device for feeding a piece of wood through a hand fed wood planing machine, a feed roller or rollers have merely been held against the upper surface of the piece of wood and rotated to cause the piece of wood to slide along the surface of a table forming part of the machine.

An object of the invention is to provide an improved feed device for a hand fed wood planing machine for automatically feeding a piece of wood through the machine so as to plane one surface thereof accurately by means of a single cutter so that it is perpendicular to the adjacent surface thereof.

The invention accomplishes the above-mentioned object by providing a press roller horizontally disposed on the upper surface of the piece of wood to resiliently press against the upper surface of the same, and another press roller vertically disposed on the lateral side of the piece of wood to resiliently press against the piece of wood against an associated feed roller. The horizontal press roller includes preferably a rubber layer attached to the periphery thereof and the vertical press roller also serves to define a perpendicular to the surface of the table on which the piece of wood is disposed. Both press rollers cooperate with each other to maintain the piece of wood in a position with the lateral surfaces of the workpiece perpendicular to the surface of the table. Then the lower surface of the piece of wood can be planed by a cutter properly projecting above the surface of the table.

The invention will become more readily apparent from the following detailed description taken in conjunction with the accompanying drawings in which:

FIG. 4 is a side elevational view of the device illustrated in FIGS. 1 through 3.

Figure 1:
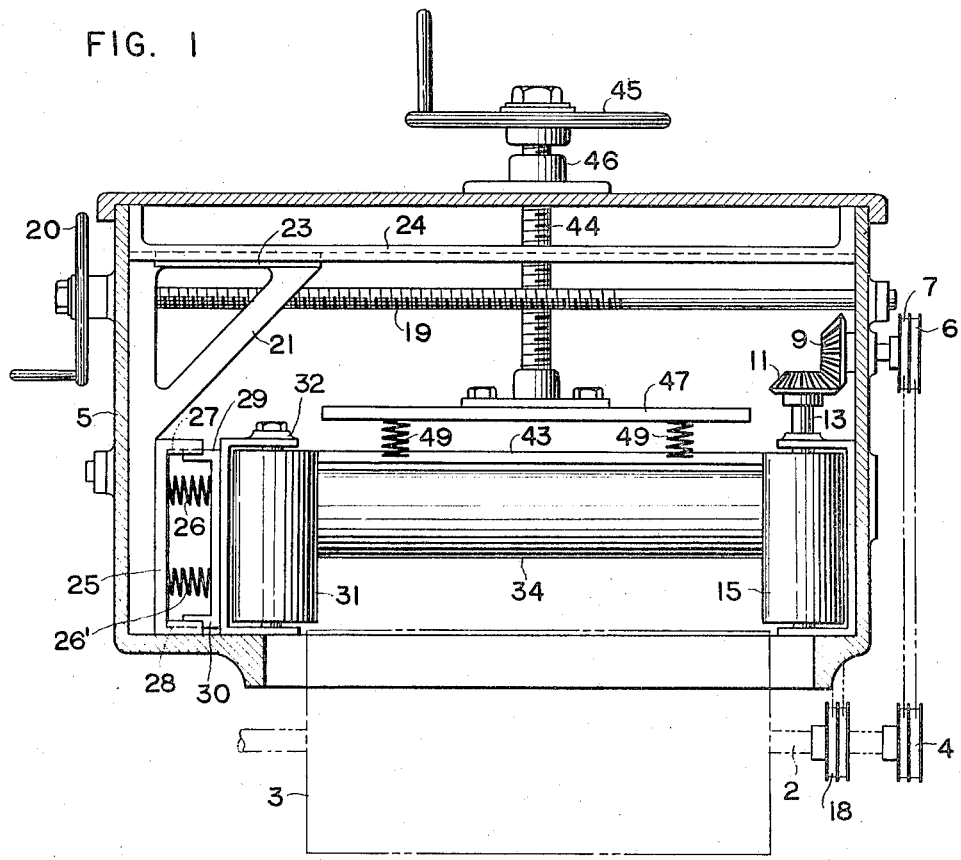
FIG. 1 is an end elevation view partly in section, of a device constructed in accordance with the teachings of the invention.

Referring now to the drawings, there is illustrated a device constructed in accordance with the teachings of the invention. The arrangement illustrated comprises a table 1 having a horizontal surface and provided at its center with a main shaft 2 and a circular cutter 3 projecting above the table and disposed in a conventional manner. Rigidly secured on the main shaft 2 at one end is a grooved pulley 4. If desired, the grooved pulley 4 can be mounted on a driving shaft driven by a separate prime mover although they are not illustrated. A machine frame 5 is provided with a pair of grooved pulleys 6 and 7 journalled in spaced relationship on the exterior of one side thereof. The respective shafts on which the grooved pulleys 6 and 7 are mounted are provided on their inner ends with bevel gears 8 and 9 within the machine frame 5 and meshing respectively with bevel gears 10 and 11 mounted on the upper ends of longitudinal shafts 12 and 13 respectively. Rigidly secured on the longitudinal shafts 12 and 13 are feed rollers 14 and 15.

The pulley 4 on the main shaft 2 is operatively coupled to the pulleys 6 and 7 through a pair of endless belts 16 and 17 respectively in order to rotate all these pulleys in a common direction. The main shaft 4 further includes a pulley 18 secured to that portion thereof disposed within the position of the side wall of machine frame 5.

A screw-threaded transverse shaft 19 is provided at each end of the frame 5 and has the ends thereof rotatably mounted in the opposite sides of the machine frame 5 and has a handle wheel 20 secured at the exposed end thereof positioned outside of the frame. The handle wheel 20 is manually operable to rotate the transverse shaft 19.

A movable control member 21 is also provided at each end of the frame and is in screw-threaded engagement with the screw-threaded shaft 19 and a slide portion 23 is slidably fitted into a guide groove formed in a grooved rod 24 which, in turn, is disposed within the machine frame 5. Thus the movable frame control member 21 can move in either direction along the shaft 19 as the latter rotates. Disposed on the lower portion of the movable frame 21 is a U-shaped member 25 provided in the interior thereof with a pair of helical springs 26 and 26'. The U-shaped member 25 has a pair of legs with internal guide grooves 27 and 28 therein. The guide grooves 27 and 28 have slidably engaged therein respective slide arms 29 and 30 disposed on the outside of a bearing box 32 for supporting a vertically disposed press roller 31. The respective vertical press rollers 31 are positioned opposite the rollers 14 and 15. It is, however, to be understood that any desired number of such pairs of opposed rollers can be provided, depending on the size of the machine. Also it will be apparent that the control member 21 has the press roller 31 resiliently mounted thereon by resilient means including the U-shaped member 25, the springs 26 and 26' and the slide arms 29 and 30.

Figure 2:
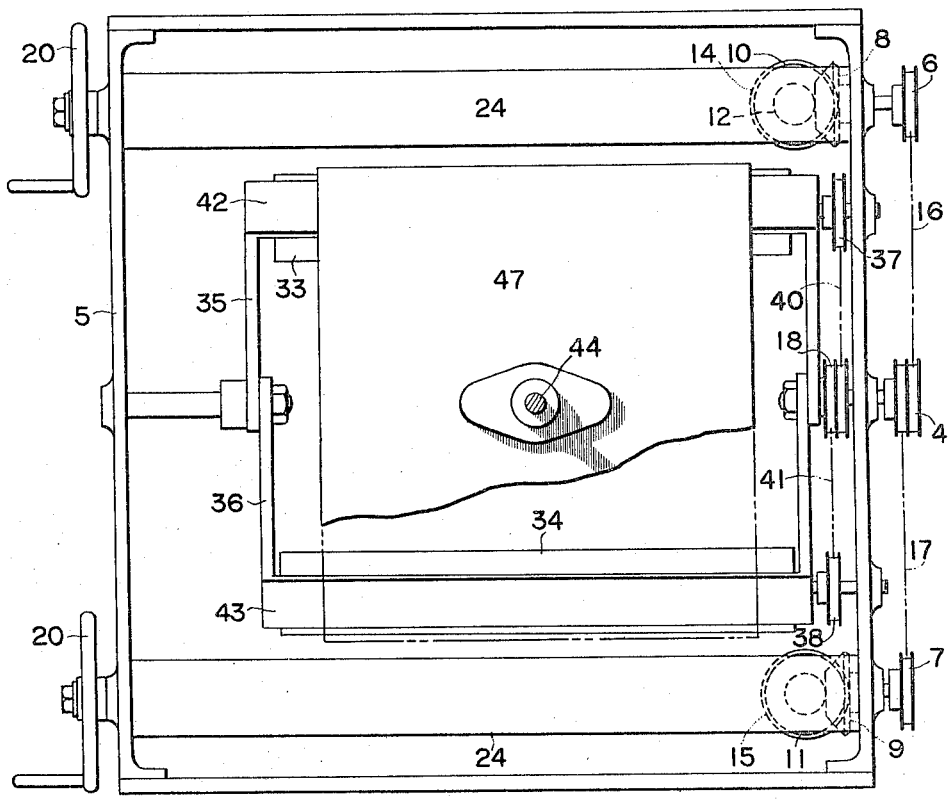
FIG. 2 is a plan view of the device illustrated in FIG. 1 with parts omitted for purposes of clarity.

A pair of press rollers 33 and 34 are horizontally disposed in positions spaced along the length of and within the machine frames 5, each including a pair of trunnions at the ends thereof journalled in respective pairs of rockable arms 35 and 36. The press rollers 33 and 34 also serve to feed a workpiece through the machine. The righthand trunnions as viewed in FIG. 2 of the press rollers 33 and 34 have a pair of pulleys 37 and 38 attached thereto. In order to drive the horizontal rollers 33 and 34 at a common rate in a common direction, an intermediate pulley 39 is rotatably supported on the upper portion of the machine frame 5 and an endless belt 40 is operatively coupled to the pulleys 18, 37 and 39 while another endless belt 41 is operatively coupled to the pulleys 18, 38 and 39.

The respective rockable arms 35 and 36 are provided at their extremities with cross rods 42 and 43. A screw-threaded shaft 44 extends vertically through the upper surface of the machine frame 5 and is provided at the upper end with a handle wheel 45 fixed thereto. In order to position the screw-threaded shaft 44 so that the lower end thereof is in any desired position relative to the machine frame 5 the shaft extends through a screw-threaded bore formed in a bearing plate 46 which, in turn, is rigidly secured on the top surface of the machine frame. The shaft 44 is further provided at the lower end with a lifting or controlling plate 47 the lower surface of which are operatively coupled to the cross rods 42 and 43 through a pair of spaced helical springs 48 and 49. Thus, as with the vertical press rollers 31, the horizontal press rollers 33 and 34 are resiliently carried by the controlling plate 47 through the springs 48 and 49.

With the arrangement thus far described in operation, the pulley 4 operatively coupled to a prime mover (not shown) drives the pulleys 6 and 7 through the endless belts 16 and 17. Then the driven pulleys 6 and 7 cause the bevel gears 10 and 11 and the longitudinal shafts 12 and 13 to be driven through the bevel gears 8 and 9 connected with the pulleys 6 and 7 respectively, whereby the feed rollers 14 and 15 fixed on the longitudinal shafts 12 and 13 respectively are driven. On the other hand, the pulley 4 secured on the shaft 2 for the prime mover (not shown) drives the pulleys 37 and 38 through the endless belts 40 and 41 respectively to thereby drive the feed and horizontal press rollers 33 and 34. It is to be noted that the rollers 14 and 15 are rotated about their respective vertically positioned longitudinal axes while the rollers 33 and 34 are rotated about their respective horizontally positioned longitudinal axes.

Figure 3:
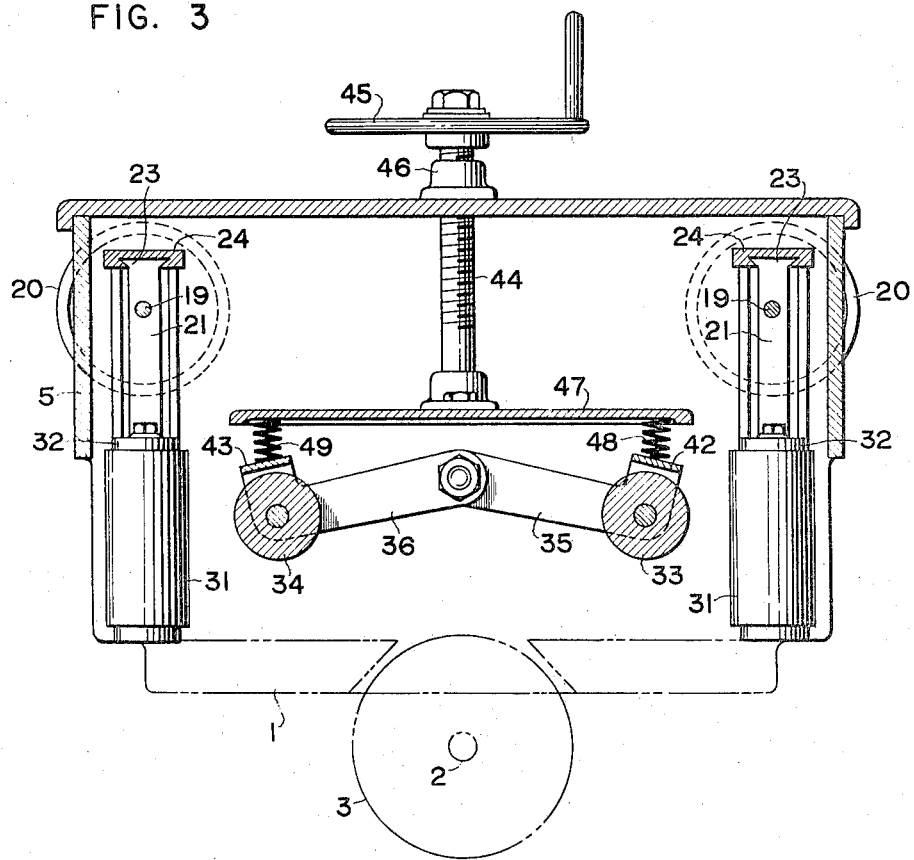
FIG. 3 is a longitudinal sectional elevational view of the device illustrated in FIGS. 1 and 2.

Under these circumstances, a piece of wood can be passed through the machine, from its front side or its righthand side as viewed in FIG. 3. The workpiece may be a plate-shaped piece of wood or a stack of several elongated rectangular pieces of wood having the same dimension. The piece of wood passing through the machine is automatically fed along surface of table 1 at a predetermined rate by rotation of the rollers 14, 15, 33 and 34 and is planed by the cutter 3. This eliminates the necessity of an operator forcedly feeding pieces of wood by hand from a position above the cutter as in the conventional machines.

In order to control the transverse dimension or width of the pieces of wood, the handle wheels 20 can be manually operated to drive the screw-threaded shaft 19 to thereby move the control members 21 in either direction in accordance with the direction of rotation of the shaft 19. This movement of each of the control members 21 causes the slide portion 23 thereof to slide along the groove in the grooved rod 24 to thereby move the U-shaped members 25 disposed on the lower portion of the movable control member 21. It is recalled that the U-shaped member 25 is provided on both legs with the guide grooves 27 and 28 into which the slide members 29 and 30 on the bearing box 32 are fitted for slight movement. Therefore rotational movement of the handle wheels 20 can control distance between the rollers 31 supported by the bearing boxes 32 and the respective rollers 14 and 15 in accordance with the width of the pieces of wood. Under these controlled conditions the piece of wood is firmly held between the rollers 31 and the rollers 14 and 15 and is passed through the machine with the righthand and lefthand sides of the workpiece maintained perpendicular to the surface of table 1.

Also, in order to control the thickness to which the piece of wood is to be planed, the handle wheel 45 can be manually operated to move shaft 44 vertically to thereby move the controlling plate 47 vertically. Vertical movement of controlling plate 47 effects vertical movement of the cross rods 42 and 43 operatively coupled to the plate 47 through the helical springs 48 and 49 to thereby move the horizontal press rollers 33 and 34 with the result that these rollers press against that surface of the workpiece contacting the same under a high pressure. This ensures that during the planting operation the workpiece is prevented from separating from the surface table 1. The vertical pressing rollers 31 also ensure that the workpiece is prevented from laterally vibrating.

Because of the provision of the helical springs 26, 26′, 48 and 49 associated with the vertical rollers 31 and the horizontal rollers 33 and 34, the force with which each of the rollers presses against the workpiece can be controlled by the resilience of the associated springs even though the vertical and upper horizontal surfaces of the workpiece are irregular or curved. This results in facilitating of planing the surface to be planed, in this case the lower surface of the workpiece, accurately with a single cutter so that it is perpendicular to the lateral surfaces thereof.

From the foregoing it will be appreciated that the invention is advantageous in that a machine frame embodying the teachings thereof can readily be mounted on any conventional planing machine on a lateral edge of its table and, by pressing on the vertical an dhorizontal surfaces of a workpiece, whether it is a single wooden member or a stack of wooden members having the same dimension, through vertical and horizontal pressing rollers respectively, they can be safely planed accurately and the workpiece is properly fed while the surface to be planed is planed accurately so that it is perpendicular to the associated surface.

What I claim is:

1. An automatic workpiece feed device for a hand fed wood planing machine including a table having a horizontal top surface, the combination of a machine frame, at least one feed roller disposed within the machine frame, with the longitudinal axis thereof perpendicular to the table surface, drive means coupled to said vertically disposed feed roller for rotating it, at least one guiding press roller mounted in said frame opposite to said vertically disposed feed roller and having the longitudinal axis thereof perpendicular to said table surface and movable toward and away from said feed roller, first control means coupled to said guiding press roller for manually controlling the distance between said vertically disposed feed roller and said guiding press roller in accordance with the width of the workpiece, said first control means including a horizontal screw-threaded transverse shaft rotatably supported by the machine frame and manually rotatable, a control member movable in either direction along the transverse shaft by rotation of the shaft, resilient means secured to the control member, and a bearing means operatively coupled to the resilient means and supporting guiding press roller, at least one displaceable press roller horizontally disposed within the machine frame opposite to said table surface and movable toward and away from said table surface, a second control means coupled to said displaceable press roller for manually controlling the distance between said horizontal press roller and said table surface in accordance with the height to which the workpiece is to be planed, said second control means including a screw-threaded manually rotated vertical shaft rotatably journalled by the machine frame, a horizontal control plate secured to the vertical shaft at the lower end thereof, and supporting means resiliently supporting said horizontal press roller on said plate, and horizontal press roller drive means coupled to said horizontal press roller and driving it, whereby the horizontal press roller cooperates with the vertically positioned feed roller to feed said workpiece in such a manner that the vertical surface of the workpiece is always maintained perpendicular to said table surface.

2. A device as claimed in claim 1, wherein said control member has an upper portion in the shape of a slide, a guide groove member on said frame having therein a guide groove parallel to said transverse shaft in which said slide slides to thereby prevent rotation of said control member, and said resilient means includes a casing secured to the lower portion of said control member and having spring means therein, and guide arms secured to the bearing means in sliding engagement with the casing.

References Cited by the Examiner
UNITED STATES PATENTS

| | | | |
|---|---|---|---|
| 2,425,944 | 8/1947 | Kvalheim | 144—242 |
| 2,664,923 | 1/1954 | Ferrari | 144—242 |

WILLIAM W. DYER, JR., *Primary Examiner.*

W. D. BRAY, *Assistant Examiner.*